United States Patent Office 3,126,271
Patented Mar. 24, 1964

3,126,271
METHOD OF CONTROLLING WEEDS
Arthur C. Thomson, San Antonio, Tex., and Chester L. Dewald, Cupertino, Stassen Y. C. Soong, Mountain View, and Mervin E. Brokke, Richmond, Calif., assignors to Stauffer Chemical Company, New York, N.Y., a corporation of Delaware
No Drawing. Filed Jan. 8, 1962, Ser. No. 164,977
6 Claims. (Cl. 71—2.5)

This invention relates to the use of certain compounds as herbicides. More particularly, the invention relates to the use of compounds of the structure

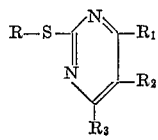

wherein R is selected from the class consisting of phenyl, substituted phenyl, phenyl alkyl, substituted phenyl alkyl, phenyl alkenyls, and substituted phenyl alkenyls, and $R_1$, $R_2$, and $R_3$ are selected from the group consisting of hydrogen, methyl, trifluoromethyl, and methoxy radicals.

The compounds of the present invention can be made by various methods. One such method is by reacting the appropriate phenyl alkyl halide or phenyl alkenyl halide with the appropriate 2-mercaptopyrimidine or its hydrochloride in the presence of a base as is taught in British Patent 758,827. Another method is to react the appropriate phenylmercaptan, phenylalkylmercaptan or phenylalkenylmercaptan with the appropriate 2-chloropyrimidine in the presence of a base. Still another method is to react the appropriate isothiouronium salt with the appropriate acetylacetone in the presence of a suitable solvent. By using these methods a number of such compounds were produced and subsequently tested for herbicidal activity. These compounds and their herbicidal activity are given in the activity table later in the specification.

The herbicidal activity of the compounds of the present invention was demonstrated by the following test. Seeds of crab grass, foxtail, wild oats, lamb's-quarters, red-root pigweed, and Jimson weed or field bindweed are planted in individual rows one-half inch deep in Santa Cruz sandy loam soil contained in compressed paper flats 8¼″ x 6½″ which are 2¾″ deep. Enough weeds are planted to give about twenty plants each of Jimson weed and wild oats and about thirty to fifty plants of each of the other weed species in each flat. The flats are watered after planting and the following day each flat is sprayed at a rate of 20 lbs. of the compound under test in 80 gallons of solution per acre. A No. 152 DeVilbiss atomizer is used to spray the solution on the soil surface. Two weeks later the degree of weed control is determined by comparing the amount of germination and growth of each weed in the treated flats with the weeds in several untreated control flats. The herbicidal activity of the compounds under test is reported as an activity index measured in percent weed control at 20 lbs./acre on six different weed species.

The following table gives the compounds tested and their activity index (A.I.).

| Compound | Chemical Identity | A.I. |
|---|---|---|
| 1 (R-4299) | 2-benzylthiopyrimidine | 42 |
| 2 (R-4521) | 2-(2-methylbenzylthio) pyrimidine | 87 |
| 3 (R-4520) | 2-(3-methylbenzylthio) pyrimidine | 94 |
| 4 (R-4296) | 2-(4-methylbenzylthio) pyrimidine | 90 |
| 5 (R-4532) | 2-(2,4-dimethylbenzylthio) pyrimidine | 87 |
| 6 (R-4525) | 2-(2,5-dimethylbenzylthio) pyrimidine | 100 |
| 7 (R-4579) | 2-(3,4-dimethylbenzylthio) pyrimidine | 66 |
| 8 (R-4530) | 2-(2,4,6-trimethylbenzylthio) pyrimidine | 80 |
| 9 (R-4534) | 2-(2,3,5,6-tetramethylbenzylthio) pyrimidine | 53 |
| 10 (R-4539) | 2-(2-chlorobenzylthio) pyrimidine | 80 |
| 11 (R-4802) | 2-(3-chlorobenzylthio) pyrimidine | 100 |
| 12 (R-4537) | 2-(4-chlorobenzylthio) pyrimidine | 94 |
| 13 (R-4298) | 2-(2,4-dichlorobenzylthio) pyrimidine | 52 |
| 14 (R-4300) | 2-(3,4-dichlorobenzylthio) pyrimidine | 42 |
| 15 (R-4865) | 2-(Mixed dichlorobenzylthio) pyrimidine | 76 |
| 16 (R-4787) | 2-(2-fluorobenzylthio) pyrimidine | 100 |
| 17 (R-4788) | 2-(3-fluorobenzylthio) pyrimidine | 100 |
| 18 (R-4789) | 2-(4-fluorobenzylthio) pyrimidine | 100 |
| 19 (R-4797) | 2-(4-bromobenzylthio) pyrimidine | 90 |
| 20 (R-4790) | 2-(4-methoxybenzylthio) pyrimidine | 86 |
| 21 (R-4304) | 2-benzylthio-4-methylpyrimidine | 72 |
| 22 (R-4529) | 2-(2-methylbenzylthio)-4-methylpyrimidine | 94 |
| 23 (R-4528) | 2-(3-methylbenzylthio)-4-methylpyrimidine | 94 |
| 24 (R-4305) | 2-(4-methylbenzylthio)-4-methylpyrimidine | 72 |
| 25 (R-4531) | 2-(2,4-dimethylbenzylthio)-4-methylpyrimidine | 87 |
| 26 (R-4526) | 2-(2,5-dimethylbenzylthio)-4-methylpyrimidine | 100 |
| 27 (R-4527) | 2-(3,4-dimethylbenzylthio)-4-methylpyrimidine | 87 |
| 28 (R-4538) | 2-(2,4,6-trimethylbenzylthio)-4-methylpyrimidine | 80 |
| 29 (R-4535) | 2-(2,3,5,6-tetramethylbenzylthio)-4-methylpyrimidine | 73 |
| 30 (R-4533) | 2-(2-chlorobenzylthio)-4-methylpyrimidine | 94 |
| 31 (R-4864) | 2-(3-chlorobenzylthio)-4-methylpyrimidine | 90 |
| 32 (R-4536) | 2-(4-chlorobenzylthio)-4-methylpyrimidine | 87 |
| 33 (R-4523) | 2-(2,4-dichlorobenzylthio) 4-methylpyrimidine | 74 |
| 34 (R-4524) | 2-(3,4-dichlorobenzylthio)-4-methylpyrimidine | 87 |
| 35 (R-4862) | 2-(Mixed-dichlorobenzylthio)-4-methylpyrimidine | 90 |
| 36 (R-4782) | 2-(2-fluorobenzylthio)-4-methylpyrimidine | 100 |
| 37 (R-4783) | 2-(3-fluorobenzylthio)-4-methylpyrimidine | 100 |
| 38 (R-4784) | 2-(4-fluorobenzylthio)-4-methylpyrimidine | 100 |
| 39 (R-4863) | 2-(4-bromobenzylthio)-4-methylpyrimidine | 95 |
| 40 (R-4785) | 2-(4-methoxybenzylthio)-4-methylpyrimidine | 86 |
| 41 (R-3400) | 2-benzylthio-4,6-dimethylpyrimidine | 100 |
| 42 (R-4374) | 2-(2-methylbenzylthio)-4,6-dimethylpyrimidine | 66 |
| 43 (R-4375) | 2-(3-methylbenzylthio)-4,6-dimethylpyrimidine | 100 |
| 44 (R-3407) | 2-(4-methylbenzylthio)-4,6-dimethylpyrimidine | 90 |
| 45 (R-4516) | 2-(2,4-dimethylbenzylthio)-4,6-dimethylpyrimidine | 80 |
| 46 (R-4511) | 2-(2,5-dimethylbenzylthio)-4,6-dimethylpyrimidine | 94 |
| 47 (R-4513) | 2-(3,4-dimethylbenzylthio)-4,6-dimethylpyrimidine | 74 |
| 48 (R-4464) | 2-(2,4,6-trimethylbenzylthio)-4,6-dimethylpyrimidine | 11 |
| 49 (R-3444) | 2-(2-chlorobenzylthio)-4,6-dimethylpyrimidine | 95 |
| 50 (R-4801) | 2-(3-chlorobenzylthio)-4,6-dimethylpyrimidine | 100 |
| 51 (R-3408) | 2-(4-chlorobenzylthio)-4,6-dimethylpyrimidine | 100 |
| 52 (R-3442) | 2-(2,4-dichlorobenzylthio)-4,6-dimethylpyrimidine | 100 |
| 53 (R-3441) | 2-(3,4-dichlorobenzylthio)-4,6-dimethylpyrimidine | 100 |
| 54 (R-4518) | 2-(Mixed dichlorobenzylthio)-4,6-dimethylpyrimidine | 94 |
| 55 (R-4778) | 2-(2-fluorobenzylthio)-4,6-dimethylpyrimidine | 100 |
| 56 (R-4779) | 2-(3-fluorobenzylthio)-4,6-dimethylpyrimidine | 100 |
| 57 (R-4780) | 2-(4-fluorobenzylthio)-46-dimethylpyrimidine | 100 |
| 58 (R-4798) | 2-(4-bromobenzylthio)-3,6-dimethylpyrimidine | 90 |
| 59 (R-4781) | 2-(4-methoxybenzylthio)-4,6-dimethylpyrimidine | 86 |
| 60 (R-4306) | 2-phenylthio-4,6-dimethylpyrimidine | 81 |
| 61 (R-4419) | 2-(2-methylphenylthio)-4,6-dimethylpyrimidine | 89 |
| 62 (R-4308) | 2-(4-methylphenylthio)-4,6-dimethylpyrimidine | 90 |
| 63 (R-4307) | 2-(4-chlorophenylthio)-4,6-dimethylpyrimidine | 86 |
| 64 (R-4466) | 2-(4-bromophenylthio)-4,6-dimethylpyrimidine | 39 |
| 65 (R-4582) | 2-(4-chlorophenylthio) pyrimidine | 60 |
| 66 (R-5617) | 2-(X-chlorobenzylmercapto)-pyrimidine | 85 |

| Compound | Chemical Identity | A.I. |
|---|---|---|
| 67 (R-5618) | 2-(X-chlorobenzylmercapto)-4-methylpyrimidine. | 90 |
| 68 (R-5619) | 2-(X-chlorobenzylmercapto)-4-6-dimethylpyrimidine. | 100 |
| 69 (R-4992) | 2-Benzylmercapto-4,6-dimethoxy pyrimidine. | 100 |
| 70 (R-4989) | 2-(3,4-Dichlorobenzylmercapto)-4,5,6-trimethyl pyrimidine. | 71 |
| 71 (R-5464) | 2-Benzylmercapto-4-methyl-6-trifluoromethylpyrimidine. | 100 |
| 72 (R-5623) | 2-(3,4-Dichlorobenzylmercapto)-4-methyl-6-trifluoromethylpyrimidine. | 9 |
| 73 (R-5624) | 2-(2,4-Dichlorobenzylmercapto)-4-methyl-6-trifluoromethylpyrimidine. | 66 |
| 74 (R-5625) | 2-(X,X-dichlorobenzylmercapto)-4-methyl-6-trifluoromethylpyrimidine. | 66 |
| 75 (R-5626) | 2-(2,4-Dimethylbenzylmercapto)-4-methyl-6-trifluoromethylpyrimidine. | 71 |
| 76 (R-4582) | 2-(4-Chlorophenylthio) pyrimidine. | 60 |
| 77 (R-4306) | 2-Phenylmercapto-4,6-dimethylpyrimidine. | 81 |
| 78 (R-4419) | 2-(2-Tolylthio)-4,6-dimethylpyrimidine. | 89 |
| 79 (R-4308) | 2-(4-Tolylthio)-4,6-dimethylpyrimidine. | 90 |
| 80 (R-4307) | 2-(4-Chlorophenylmercapto)-4,6-dimethylpyrimidine. | 86 |
| 81 (R-4466) | 2-(4-Bromophenylmercapto)-4,6-dimethylpyrimidine. | 39 |
| 82 (R-4920) | 2-(α-Phenylethylmercapto)4,6-dimethylpyrimidine. | 100 |
| 83 (R-4494) | 2-(B-phenylethylmercapto)4-6-dimethylpyrimidine. | 76 |
| 84 (R-4923) | 2-(3-Phenylpropylmercapto)4,6-dimethylpyrimidine. | 47 |
| 85 (R-5226) | 2-Cinnamylmercapto-4,6-dimethylpyrimidine. | 19 |
| 86 (R-4919) | 2-(α-Phenylethylmercapto)-4-methylpyrimidine. | 100 |
| 87 (R-5231) | 2-(B-phenylethylmercapto)-4-methylpyrimidine. | 80 |
| 88 (R-4922) | 2-(3-Phenylpropylmercapto)-4-methylpyrimidine. | 61 |
| 89 (R-5225) | 2-Cinnamylmercapto-4-methylpyrimidine. | 42 |
| 90 (R-4918) | 2-(α-Phenylethylmercapto)pyrimidine. | 100 |
| 91 (R-5348) | 2-(B-phenylethylmercapto)pyrimidine. | 90 |
| 92 (R-4921) | 2-(3-Phenylpropylmercapto)pyrimidine. | 95 |
| 93 (R-5224) | 2-Cinnamylmercapto pyrimidine. | 71 |

We claim:
1. A method of controlling weeds comprising applying to a weed habitat a phytotoxic amount of a compound of the formula:

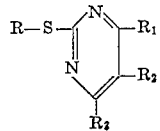

wherein R is selected from the group consisting of phenyl, substituted phenyl, phenyl alkyl, substituted phenyl alkyl, phenyl alkenyl and substituted phenyl alkenyl, said substituents being selected from the group consisting of halogen, lower alkyl and lower alkoxy, and $R_1$, $R_2$, and $R_3$ are selected from the group consisting of hydrogen, methyl, trifluoromethyl, and methoxy radicals.

2. A method of controlling weeds comprising: applying to a weed habitat a phytotoxic amount of 2-(dichlorobenzylthio)-4,6-dimethylpyrimidine.

3. A method of controlling weeds comprising: applying to a weed habitat a phytotoxic amount of 2-benzylmercapto-4,6-dimethylpyrimidine.

4. A method of controlling weeds comprising: applying to a weed habitat a phytotoxic amount of 2-(4-chlorobenzylmercapto)-4,6-dimethylpyrimidine.

5. A method of controlling weeds comprising: applying to a weed habitat a phytotoxic amount of 2-(3,4-dichlorobenzylmercapto)-4,6-dimethylpyrimidine.

6. A method of controlling weeds comprising: applying to a weed habitat a phytotoxic amount of 2-(2,4-dichlorobenzylmercapto)-4,6-dimethylpyrimidine.

References Cited in the file of this patent
FOREIGN PATENTS

| 198,997 | Austria | Aug. 11, 1958 |
| 758,827 | Great Britain | Oct. 10, 1956 |